June 15, 1937. J. W. CARROLL 2,084,191
HYDRAULIC BRAKE SYSTEM COUPLER
Filed Oct. 4, 1933
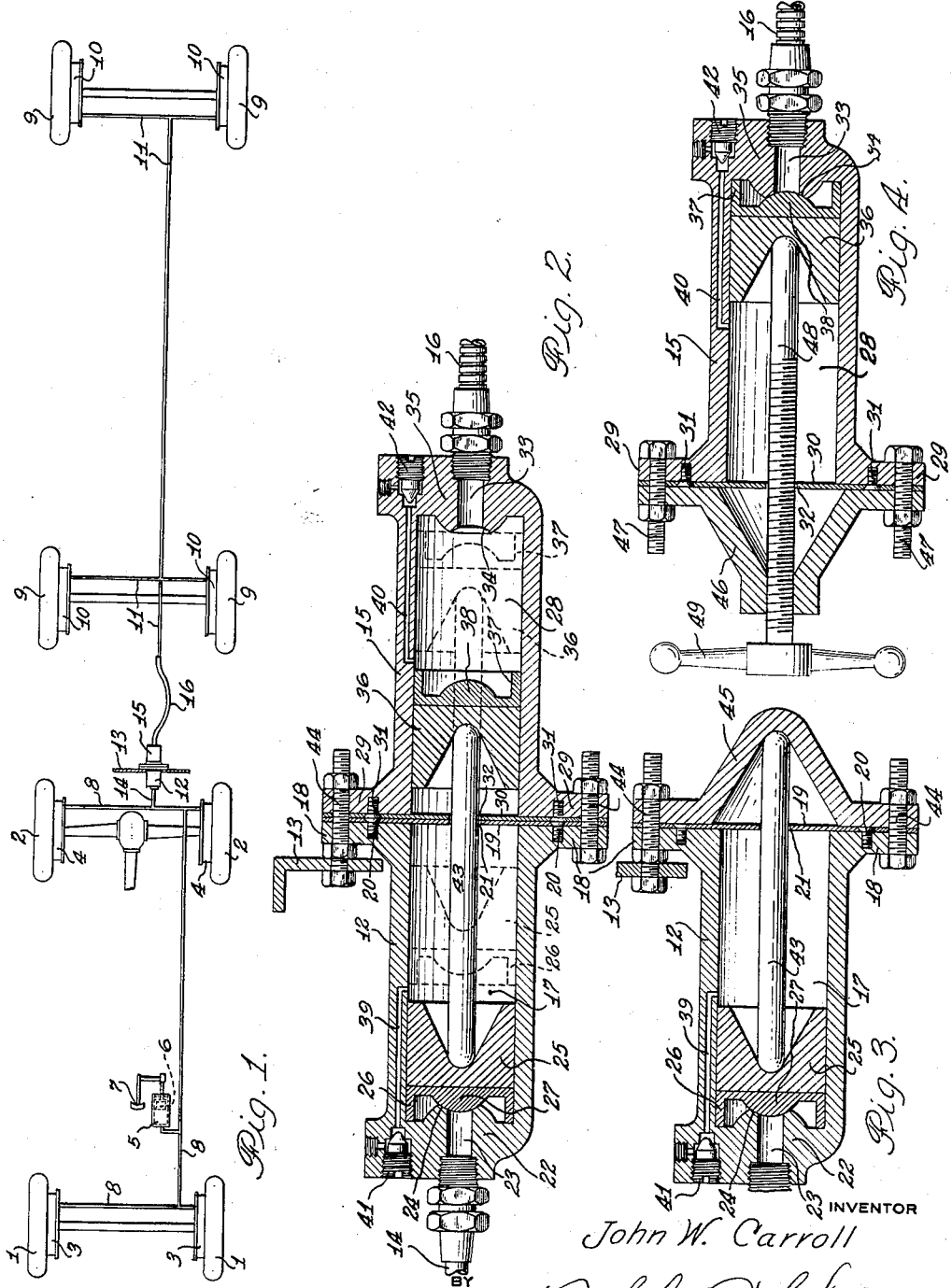
INVENTOR
John W. Carroll
ATTORNEYS Patented June 15, 1937

2,084,191

UNITED STATES PATENT OFFICE 2,084,191

HYDRAULIC BRAKE SYSTEM COUPLER

John W. Carroll, Detroit, Mich.

Application October 4, 1933, Serial No. 692,103

4 Claims. (Cl. 188—3)

The present invention pertains to couplers for connecting hydraulic brake systems and is particularly adapted for use in tractor trailer combinations and with tractors and semi-trailers wherein the braking pressure is applied by means on the tractor and is transmitted through fluid to the trailer or semi-trailer to actuate brakes thereon.

The primary object of the present invention is to provide coupling means for connecting separate hydraulic brake systems so that application of pressure on the fluid in one system tending to actuate the brakes therein, also causes actuation of the brakes forming a part of the other system. Such a construction is desirable in connection with tractors having a hydraulic brake system and hydraulic pressure means for actuating the brakes thereof so that a trailer or a semi-trailer connected to the tractor may be provided with a hydraulic brake system which may be coupled to the brake system of the tractor to be actuated by the same pressure means and in unison with the brakes on the tractor.

Another object of the present invention is to provide coupling means between a hydraulic brake system on a tractor and a hydraulic brake system on a trailer so that a single hydraulic pressure means may be provided to actuate both systems, said coupler being constructed so that uncoupling of the two brake systems does not render the system on the tractor inoperative and does not occasion loss of fluid therefrom.

Another object of the present invention is to provide a coupler for hydraulic brake systems on tractor trailer combinations which provides for actuation of the trailer brakes by pressure generating means on the tractor, which coupler provides means for disconnecting the brake system on the trailer from the pressure means on the tractor when the tractor is uncoupled from the trailer.

Another object of the present invention is to provide a coupler between a trailer hydraulic brake system and hydraulic pressure means on a tractor so that when said coupler is disconnected, when the tractor and trailer are uncoupled, the brakes on the trailer may be held in an applied position. Such a feature is desirable in order that the tractor and trailer may be easily recoupled.

With the above and other ends in view the invention consists in matters hereinafter set forth and more particularly pointed out in the appended claims, reference being had to the accompanying drawing, in which Figure 1 is a diagrammatic plan of coupled tractor and trailer brake systems;

Fig. 2 is a longitudinal cross section illustrating the parts of the coupler in connected relation; and Figs. 3 and 4 are cross sections of the parts of the coupler in separated relation.

Like characters of reference are employed throughout to designate corresponding parts.

With reference to Fig. 1 the numeral 1 designates the front wheels of a tractor and 2 the rear wheels. Associated with the wheels 1 and 2 are brakes 3 and 4 respectively and it is to be understood that the brakes include hydraulic mechanisms adapted to be actuated by fluid under pressure. The construction of the hydraulic mechanism forms no novel part of the present invention and in view of the fact that numerous types of hydraulic brakes are well known and readily available in the art the same have not been shown in detail. Mounted on the tractor, in a manner also well known in the art, is a cylinder 5 in which is mounted a slidable piston 6 which is adapted to be reciprocated by a foot pedal 7. A line 8 is connected to the cylinder 5 and to each of the brakes 3 and 4. The cylinder 5 and line 8 are filled with a liquid upon which pressure is applied by movement of the piston 6 as a result of depression of the foot pedal 7.

From the foregoing it will be understood that the tractor and the hydraulic brake system thereon are of conventional constructions and that the same are well known to those versed in hydraulic brake art.

Also diagrammatically illustrated in Fig. 1 are trailer wheels 9 having hydraulic brakes 10 connected together by a line 11. It will be understood that the line 11 is normally full of liquid upon which pressure may be applied in a manner to be presently described in order to actuate the brakes 10.

A coupler cylinder 12 is attached to a stationary part 13 of the tractor frame and is connected by a tube 14 to the line 8. A second coupler cylinder 15 has a flexible tube 16 connected at one end thereto and at its other end to the line 11. The construction of the cylinders 12 and 15 and the association of parts therewith forms the essence of the present invention and will now be described in detail.

The cylinder 12 is formed with a cylindrical chamber 17 and an end flange 18 to which a cover plate 19 is secured by screws 20, the cover plate having a central opening 21. The opposite end of the cylinder 12 has an end wall 22 provided with a passage 23 which connects the pipe 14 to the chamber 17. On the inner end of the passage 23 is formed a valve seat 24. Reciprocally mounted in the chamber 17 is a piston 25 and a flexible cup seal 26 is secured to the piston and interposed between the piston 25 and the passage 23. The flexible seal 26 has a dome-shaped protuberance 27 adapted to seat upon the valve seat 24 to close the passage 23 for a purpose and in a manner to be hereinafter set forth.

The coupler part 15 is formed with a cylindrical chamber 28 and an end flange 29 having a cover plate 30 secured thereto by means of screws 31. The cover plate 30 has an opening 32 centrally located relative to the axis of the cylindrical chamber 28. The end wall 35 of the coupler part 15, which is opposite to the end having the flange 29, has a passage 33 providing communication between the flexible tube 16 and the cylindrical chamber 28 and surrounding the inner end of this passage is a valve seat 34. Reciprocally mounted in the chamber 28 is a piston 36 carrying a flexible cup seal 37, the latter being interposed between the piston and the passage 33 and having a dome shaped protuberance 38 adapted to engage the valve seat 34.

The coupler parts 12 and 15 are provided with bleeder passages 39 and 40 respectively communicating with the chambers 17 and 28. Bleeder valves 41 and 42 are adapted to close or open the passages 39 and 40 to facilitate removal of any air which might become trapped in the chambers 17 and 28.

From the foregoing it is apparent that the chamber 17 is in fluid communication with the hydraulic pressure medium 5 and the chamber 28 is in fluid communication with the brakes 10. Therefore it is obvious that pressure applied on the fluid by the hydraulic pressure medium 5 results in movement of the piston 25, and that if the piston 36 were caused to move it would exert a pressure on the fluid in the lines 11 tending to actuate the brakes 10. Accordingly means is provided to cause movement of the piston 36 in unison with the piston 25, and this means comprises a rod 43 which is interposed between the pistons 25 and 36 while the two coupler parts 12 and 15 are held in end to end relation by attaching elements 44 which engage the flanges 18 and 29.

In operation, fluid under pressure created by the pressure medium 5 passes through the tube 14 and passage 23 to enter the chamber 17. The fluid under pressure expands the seal 26 to prevent possibility of any leakage and also causes longitudinal movement of the piston 25 in the right hand direction relative to Fig. 2. The rod 43, which extends through the openings 21 and 32 in the cover plates 19 and 30, is also caused to move longitudinally to transmit like movement to the piston 44. Movement of the piston 44 in a direction toward the right of Fig. 2 forces the fluid from the chamber 28 to the brakes 10 and causes actuation thereof. Inasmuch as the movement of the piston 25 only happens when the fluid in the lines 8 is under pressure, that movement takes place while the brakes 3 and 4 are being applied and therefore the brakes 3 and 4 and the brakes 10 will be applied simultaneously by operation of the hydraulic pressure medium 5.

In Fig. 3 the coupler member 12 is shown uncoupled from the coupler member 15 and in order to hold the piston 25 against movement when the hydraulic pressure medium 5 is actuated there is provided a cap 45 which is secured to the flange 18 by bolts 44 which were previously employed to secure the flange 29 thereto. The cap 45 engages the end of the rod 43 so that when the bolts 44 are tightened the piston 25 is held in a position where the protuberance 27 engages the valve seat 24 to close the passage 23. Thus there is no possibility of fluid under pressure entering the chamber 17 to escape from the hydraulic brake system on the tractor, or in a manner to build up pressure on the piston 25 tending to move the same.

If it is desired to hold the trailer brakes in their set position after the coupler parts 12 and 15 have been uncoupled a cap 46 is secured to the flange 29 by bolts 47, or other known securing means. In the cap 46 is mounted a screw-threaded rod 48 which is adapted to engage the piston 36 to hold it in any desired position of adjustment or in some cases to force the piston to a position where the dome shaped protuberance 38 engages the valve seat to prevent the fluid in the trailer brake system from entering the chamber 28. For rotating the screw 48 manually there is provided a handle 49.

From the foregoing it becomes apparent that the present coupler provides means for connecting two separate hydraulic brake systems so that both systems may be actuated by a common hydraulic pressure medium. It is also apparent that the piston 25 which, when coupled, moves as a result of brake actuating pressure on the tractor, does not move as a result of such pressure when the coupler is not uncoupled, and accordingly does not reduce the efficiency of the tractor brakes nor does it permit leakage of fluid. Furthermore, it becomes apparent that the piston 44 may be held in a position where the fluid is trapped in the trailer brake system with the brakes of said system in their set position, or the piston may be permitted to move freely in order that no pressure tending to apply the trailer brakes is built up thereby.

Although a specific embodiment of the present invention has been illustrated and described it is to be understood that various changes may be made within the scope of the appended claims without departing from the spirit of the invention, and such changes are contemplated.

What I claim is:—

1. The combination with two separate hydraulic brake systems, of a fluid pressure medium in one of said systems, a pair of coupling elements each in fluid communication with one of said systems, movable elements in said coupling elements, and means in at least one of said coupler elements rendered operative by movement of the movable element therein for sealing the said coupler element against fluid communication with its connected system.

2. A device for connecting two independent fluid pressure brake systems so that pressure on the fluid in one system is transmitted to the fluid in the other system, said device comprising two cylindrical bodies each having one of their ends closed by walls provided with means for connecting them to respective brake systems, a piston mounted in each of said cylindrical bodies, means carried by at least one of said pistons for sealing the means for providing communication of its respective cylindrical body with its respective brake system, plates removably mounted on the other ends of said cylindrical bodies, said plates having central apertures therein, a rigid element extending through the said apertures and having its opposite ends engaging pistons in different bodies, and means for detachably securing said cylindrical bodies together.

3. A device for connecting two independent fluid pressure brake systems so that pressure on the fluid in one system is transmitted to the fluid in the other system, said device comprising two cylindrical bodies each having one of their ends closed by walls provided with means for connecting them to respective brake systems, a piston mounted in each of said cylindrical bodies, plates removably mounted on the other ends of said cylindrical bodies, said plates having centrally disposed centering apertures therein, a rigid element extending through the centering apertures and having its opposite ends loosely engaging pistons in different bodies, and means for detachably securing said cylindrical bodies together.

4. A device for connecting two independent fluid pressure brake systems so that pressure on the fluid in one system is transmitted to the fluid in the other system, said device comprising two cylindrical bodies each having one of their ends closed by walls provided with means for connecting them to respective brake systems, a piston mounted in each of said cylindrical bodies, plates removably mounted on the other ends of said cylindrical bodies, said plates having centrally disposed centering apertures therein, a rigid element loosely inserted through the centering apertures in said plates and having its opposite ends in unsecured engagement with pistons in different cylindrical bodies, and detachable means for securing said cylindrical bodies together.

JOHN W. CARROLL.